(12) United States Patent
Lovis et al.

(10) Patent No.: US 10,682,788 B2
(45) Date of Patent: Jun. 16, 2020

(54) METHOD AND APPARATUS FOR RECYCLING PACKAGING MATERIAL

(71) Applicant: SAPERATEC GMBH, Bielefeld (DE)

(72) Inventors: Florian Lovis, Bielefeld (DE); Horst Seibt, Bielefeld (DE); Sebastian Kernbaum, Bielefeld (DE)

(73) Assignee: SAPERATEC GMBH, Bielefeld (DE)

( * ) Notice: Subject to any disclaimer, the term of this patent is extended or adjusted under 35 U.S.C. 154(b) by 0 days.

(21) Appl. No.: 15/309,199

(22) PCT Filed: May 5, 2015

(86) PCT No.: PCT/EP2015/059856
§ 371 (c)(1),
(2) Date: Nov. 6, 2016

(87) PCT Pub. No.: WO2015/169801
PCT Pub. Date: Nov. 12, 2015

(65) Prior Publication Data
US 2017/0080603 A1    Mar. 23, 2017

(30) Foreign Application Priority Data

May 5, 2014 (GB) .................................. 1407891.9

(51) Int. Cl.
*B29B 17/02* (2006.01)
*C08J 11/08* (2006.01)
(Continued)

(52) U.S. Cl.
CPC ................ *B29B 17/02* (2013.01); *B22F 3/02* (2013.01); *C08J 7/02* (2013.01); *C08J 11/08* (2013.01);
(Continued)

(58) Field of Classification Search
CPC ... B22F 3/02; B29B 17/02; B29B 2017/0293; B29L 2007/008; B29L 2009/003;
(Continued)

(56) References Cited

U.S. PATENT DOCUMENTS

| 5,421,526 A | 6/1995 | Johansson et al. |
| 5,891,836 A | 4/1999 | Kacher |

(Continued)

FOREIGN PATENT DOCUMENTS

| CN | 103131042 A | 6/2013 |
| CN | 104744724 A | 7/2015 |

(Continued)

OTHER PUBLICATIONS

Buerkle GmbH, "Chemical Resistance," 2016.
(Continued)

*Primary Examiner* — Frances Tischler
(74) *Attorney, Agent, or Firm* — 24IP Law Group USA, PLLC; Timothy R DeWitt

(57) ABSTRACT

A method for recycling of packaging material (300) is disclosed. The packaging material (300) comprises a multiple layer material (10) comprising a metal layer (50), at least one polymer layer (20, 40, 60) and, optionally, a paperboard layer (30). The method comprises placing the residual waste in a vat (360) comprising a separation fluid (375) to produce a mixture of metal shreds from the metal layer (50), plastic shreds from the polymer layer (20, 40, 60) and residual components. The separation fluid comprises a mixture comprising at least one swelling agent and at least one carboxylic acid.

15 Claims, 3 Drawing Sheets

(51) Int. Cl.
*B22F 3/02* (2006.01)
*C08J 7/02* (2006.01)
*B29L 9/00* (2006.01)
*B29L 7/00* (2006.01)

(52) U.S. Cl.
CPC . *B29B 2017/0293* (2013.01); *B29L 2007/008* (2013.01); *B29L 2009/003* (2013.01); *C08J 2323/00* (2013.01); *Y02W 30/622* (2015.05); *Y02W 30/701* (2015.05)

(58) Field of Classification Search
CPC .......... C08J 11/08; C08J 2323/00; C08J 7/02; Y02W 30/622; Y02W 30/701
See application file for complete search history.

(56) References Cited

U.S. PATENT DOCUMENTS

| | | |
|---|---|---|
| 5,905,064 A | 5/1999 | Drapier |
| 6,696,399 B1 | 2/2004 | Chernin et al. |
| 2013/0319618 A1 | 12/2013 | Kernbaum et al. |

FOREIGN PATENT DOCUMENTS

| | | |
|---|---|---|
| DE | 4306347 A1 | 8/1994 |
| EP | 0 543 302 A1 | 5/1993 |
| EP | 2045320 B1 | 4/2012 |
| WO | 03/104315 A1 | 12/2003 |
| WO | 2009037349 A2 | 3/2009 |
| WO | 2010052016 A2 | 5/2010 |
| WO | 2010108639 A2 | 9/2010 |
| WO | 2011082802 A1 | 7/2011 |
| WO | 2012074371 A1 | 6/2012 |
| WO | 2012101189 | 8/2012 |
| WO | 2013051161 A1 | 4/2013 |

OTHER PUBLICATIONS

ASV Stübbe GmbH & Co., "Chemical Resistance List," May 7, 2018.
R. Coles, "Food Packing Technology," 2003.
R. Hansen, "The Three Dimensional Solubility Parameter and Solvent Diffusion Coefficient," Copenhagen Danish Technical Press 1967.
B. Miller-Chou and J. Koenig, "A review of polymer dissolution," Prog. Polym. Sci. 28 (2003) pp. 1223-1270.
K. March and B. Bugusu, "Food Packaging—Roles, Materials, and Environmental Issues," Journal of Food Science, vol. 72, Nr. 3, 2007, pp. 39-55.

METHOD AND APPARATUS FOR RECYCLING PACKAGING MATERIAL

CROSS REFERENCE TO RELATED APPLICATIONS

This application is a US national phase entry of International Patent Application No. PCT/EP2015/059856 filed on 5 May 2015 and claiming priority to and benefit of UK Patent Application No GB1407891.9 filed on 5 May 2014. The disclosures of both of these applications are incorporated herein by reference.

FIELD OF THE INVENTION

The invention comprises a method and apparatus for recycling packaging material comprising a multiple layer material comprising a metal layer and at least one plastic layer.

BACKGROUND OF THE INVENTION

The use of microemulsions for the separation of laminates is known, for example, from the Applicant's co-pending patent application No. WO 2012/101189, which teaches the separation of layers in a multiple layer material from each other. The examples of this disclosure are directed towards the separation of multiple layer materials used in photovoltaic modules.

The requirement to improve the recycling of laminates used in food packaging has been discussed. For example, an article on "The recycling of tetra pak aseptic cartons" by Mario Abreu (found on www.environmental-expert.com) discusses this issue extensively and notes that the recycling of cellulose tissues is possible, but the separation of polyethylene from the aluminum foil is not possible.

U.S. Pat. No 5,421,526 (Tetra Laval) teaches a method of recovering individual material components, such as metal, plastic and, where applicable, paper, from waste of laminated packaging materials comprising layers of metal, plastic and possibly paper or cardboard. The layers are separated from each other by treating the waste with an organic acid or a mixture of organic acids, selected from among formic acid, acetic acid, propanoic acid, butyric acid and other similar volatile organic acids. The method of this patent is carried out at a high temperature (80° C.), close to the flash point of acetic acid (ca. 90° C. at 80% concentration), which not only requires a large amount of energy, but also adds a safety risk. The mixture used is because of the high concentration (80%) of acetic acid highly aggressive. This mixture will attack the aluminum components and lead to formation of hydrogen, as well as a loss of the amount of aluminum recovered in the process.

European Patent Application EP 0 543 302 A1 (Kersting) teaches a method for separating aluminum foil from plastic foils, such as PE foils, to enable the recycling of the aluminum. The laminates are placed in a 20% solution of low fatty acids (e.g. acetic acid, propionic acid, formic acid, butonoic acid) and heated to 100° C. for 10-20 minutes. The method is preferably carried out in a closed vessel to operate the liquid at and/or above its boiling point. In addition, an underpressure can be created as the solution is cooled.

SUMMARY OF THE INVENTION

A method for the separation of a metal layer from a polymer layer in a multiple layer material is taught in this disclosure. The method comprises placing the multiple layer material in a vat with a separation fluid for separating the layers in the multiple layer material. The separation fluid comprises a mixture comprising a carboxylic acid and a swelling agent for the polymer.

The swelling agent used is a hydrocarbon solvent in some embodiments of the invention.

In a further aspect of the invention, the separation fluid further comprises water and at least one surfactant and is a microemulsion. The surfactant can be selected from the group of anionic surfactants consisting of alkyl sulfonates and sulfates, alkylbenzene sulfonates and sulfates, olefin sulfonates, alkyl ether sulfonates and sulfates or mixtures thereof.

The swelling agent is selected from the group of hydrocarbon solvents consisting of aromatic hydrocarbons, such as toluene, xylene, ethylbenzene or solvents of the solvent naphtha types, alicyclic hydrocarbons, such as cyclohexane or decalin, olefins, terpenes, and acyclic aliphatic hydrocarbons, or mixtures thereof. In further embodiments of the invention, other aprotic solvents are used as swelling agents, selected from the group consisting of ketones, ethers and esters, or mixtures thereof.

The at least one carboxylic acid is selected from the group of short chain carboxylic acids consisting of acetic acid, formic acid or propanoic acid, or mixtures thereof.

The method can also include the sieving/filtering of the separation fluid together with components of the multiple layer material to reclaim the components of the multiple layer material from the separation liquid, and thereafter sorting to obtain a first fraction of metal from the metal layer and a second fraction of plastic from the polymer layer. In some aspects of the invention, a third fraction of a different kind of polymer can be obtained. This enables recycling of the materials from the multiple layer material. The obtained to polymers can be extruded and the metal melted to form new products.

The disclosure also teaches a method for recycling a packaging material comprising the multiple layer material and an additional paperboard layer. The method comprises treating in a first vat the packaging material to remove a substantial portion of the paper layer with water as a slurry and thus to produce residual waste, and subsequently placing the residual waste in a second vat comprising the separation fluid to produce a mixture of metal shreds from the metal layer, plastic shreds from the polymer layer and possibly residual components.

An apparatus for the recycling of packaging material is also disclosed. The apparatus comprises a vat having the separation fluid, a transportation device for transporting the multiple layer material into the vat and a sieving/filtration device for removing separated materials from the combination of the separation fluid and the packaging material.

It will be appreciated that the term "multiple layer material" used in this disclosure is intended to encompass objects comprising several layers of material. Non-limiting examples of the several layers of materials include objects in which the layers are laminated, bonded or glued together or one of the materials could be deposited on another of the materials. The multiple layer material can include a paperboard layer, as known from beverage containers, but does not need to include a paperboard layer.

The method as described below in a non-limiting embodiment is used for the recycling of laminates in a beverage container. It will be appreciated, however, that the method can also find application in the recycling of other laminates used in other applications.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with the feature of a different aspect or aspects and/or embodiments of the invention.

Figure 1:
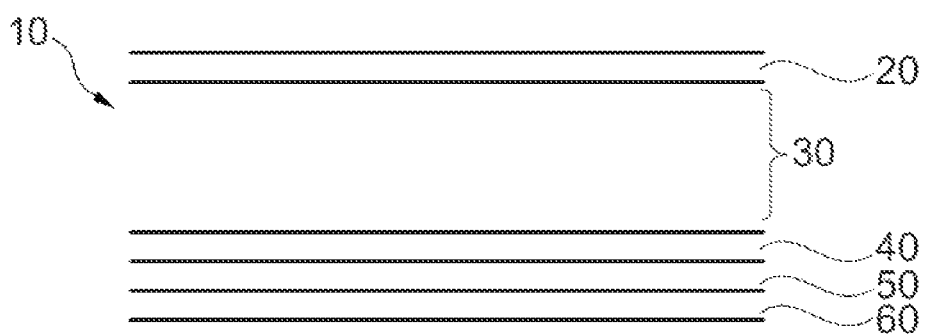
FIG. 1 shows one illustrative example of a laminate used in an aseptic packaging, which is recycled using the method of this disclosure.

FIG. 1 shows a non-limiting example of a laminate 10 used in an aseptic packaging. The laminate 10 comprises a first polymer layer 20, which is bonded to a paperboard or cardboard layer 30. The paperboard layer 30 is bonded to a second polymer layer 40, which is in turn bonded to an aluminum layer 50 and has, on its other side, a third polymer layer 60. Bonding agents are used between the different layers. Bonding agents include, but are not limited to, ethylene/acrylic acid copolymer and/or polyurethane adhesives.

The laminate 10 is used, in one aspect of the invention, in an aseptic packaging, such as the ones used for fruit juice and milk as well as tomato purees and similar fluids. Similar packaging is also used for other foods, such as snack foods.

The laminate 10 comprises the paperboard layer 30, which can be recycled by separating out the cellulose fibers. It is more difficult to recycle the polymer layers 20, 40 and 60 as well as to separate the aluminum layer 50 from the second polymer layer 40 and the third polymer layer 60, as was discussed in the introduction. It will be noted that the laminate 10 shown in FIG. 1 is merely an example of one type of laminate or multiple layer to material that can be recycled using the teachings of this disclosure.

In one non-limiting example of the invention, the polymer layers 20, 40 and 60 are made of low-density polyethylene and the metal layer 50 is made of aluminum. This is not limiting of the invention and other polyolefins or plastics, such as polyamides or polyesters, could be used. Similarly the metal layer 50 could be an aluminum alloy or another metal.

Some types of packaging include multiple layer materials or laminates 10 with more than one or no paperboard layer 30, or multiple layer materials with a single polymer layer 60. In other words, it is possible to have multiple layer materials comprising only two polymer layers 40 and 60 with a metal layer 50, or only a single polymer layer 40 with a metal layer 50. The teachings of this disclosure are also applicable to these types of multiple layer materials, and are not restricted to the multiple layer materials mentioned.

Figure 3:
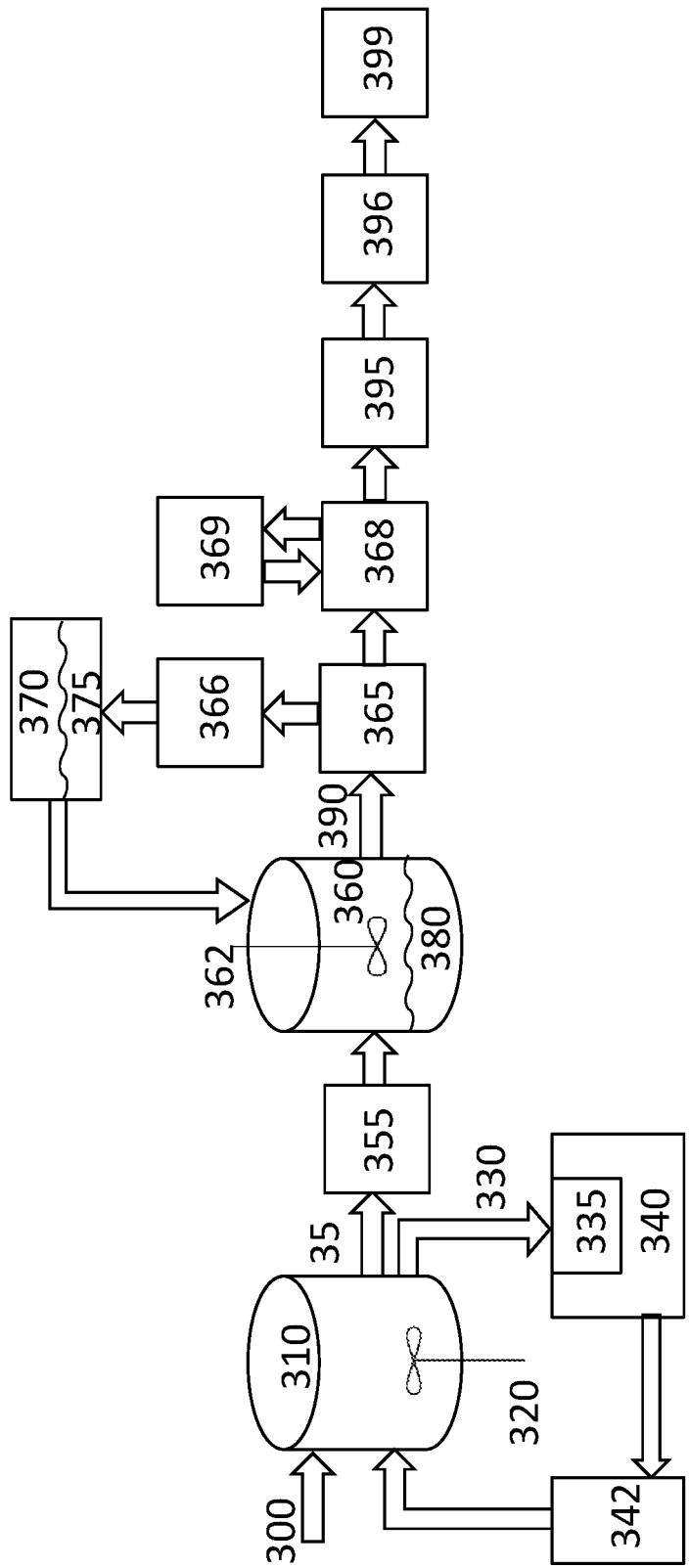
FIG. 3 shows an overview of the apparatus for recycling using the teachings of this disclosure.

FIG. 3 shows an example of a recycling plant for the recycling of the laminates 10 of this disclosure. It will be appreciated that the plant shown in FIG. 3 is merely exemplary and is not limiting of the invention. The system includes a first vat 310 and a second vat 360, together with a pulp processor 340. The first vat 310 has an agitator 320 to stir up and agitate up the contents of the first vat 310. The first vat 310 is connected to the pulp processor 340 by means of a pipe 330. The second vat 360 is connected to the first vat 310 by means of a conduit 350, which includes a dewatering device 355. The second vat 360 has a fluid dispenser 370 for dispensing separating fluid 375 into the second vat 360. The second vat 360 has an outlet 390 for removing materials 380 from the second vat 360.

The materials can be sieved from the separation fluid 375 in a sieving device 365; washed with water in a washer 368, dried in a dryer 395 and sorted in a sorter 396. The sorting can be done by wind-sifting. It will be appreciated that the sorting also can take place before drying in wet environments, e.g. by float-sink-separation techniques. The separation fluid 375 is recycled in device 366, mostly to be cleaned of impurities by filtration. The washing water is also recycled to clean the washing water in a water recycling device 369. The recycling includes cross-flow filtration techniques and/or reverse osmosis, which also allow reclaiming of at least some of the chemicals of the separation fluid 375 from the washing water.

Figure 2:
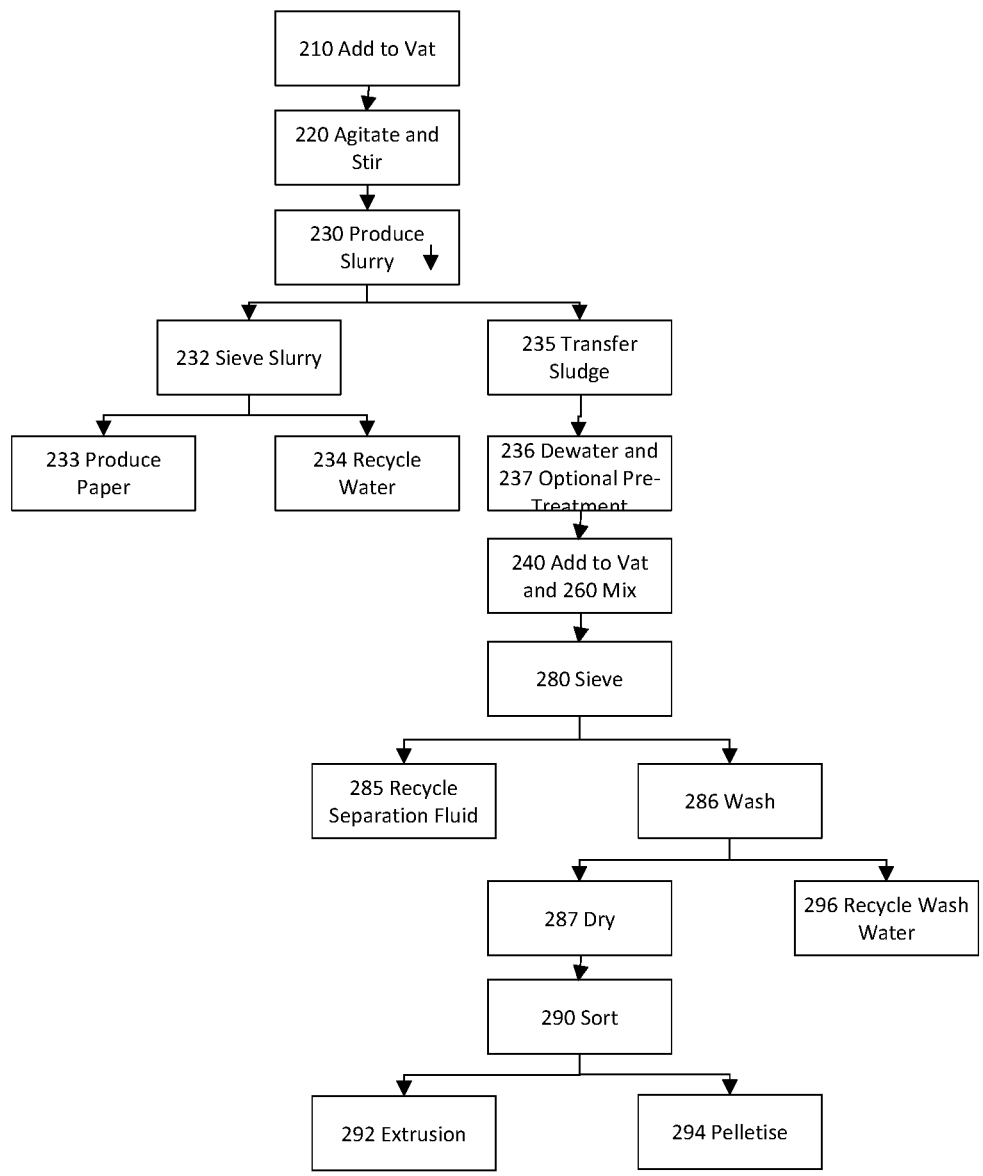
FIG. 2 shows a flow diagram of the method using the teachings of this disclosure.

FIG. 2 shows an outline of the method for recycling of the laminates 10 used in the apparatus shown in FIG. 3. The laminates 10 are collected together as bales 300 of recycling packaging material. The laminates 10 will generally have been pressed together in the bales 300 to reduce their volume. The laminates 10 may have been washed to remove any food rests at a waste refuse collection and/or processing plant. On arrival at the recycling plant, the bales 300 are placed first into the first vat 310 also called a pulper—with a significant amount of water in step 210. The agitator 320 agitates and stirs in step 220 the recycling material 300 with the water in the first vat 310 to produce a slurry in step 230. The effect of the process—termed hydropulping—of the first vat 310 is to mechanically remove much of the paperboard layer 30 from the first polymer layer 20 and the second polymer layer 40. The resulting slurry, which comprises cellulose fibers and water, is passed through the pipe 330 and then sieved in step 232 to remove the cellulose fibres in a sieving device 335 in the pulp processing machine 340. The cellulose fibers can then be recycled as paper in step 233. The water is recycled in step 234 in a water treatment plant 342.

The remaining sludge in the first vat 310 comprises a mixture of the first plastic layer 20 and the multi layer material comprising the second layer 40, the metal layer 50 and the third polymer layer 60. This sludge is transferred in step 235 by the conduit 350 and is dewatered or dried in the dewatering device 355 in step 236. In prior art this would have been the end of the process. The sludge of the prior art can be converted to some products, but is generally not of great use, if not used as energy carrier. The sludge can optionally be pre-treated in step 237 by further shredding or removal of residual elements, such as metal particles or polypropylene plastic as found in caps.

In step 240, the sludge is added in the second vat 360 with a separation fluid 375 from the fluid dispenser 370. The mixture of the separation fluid 375 and the sludge is then mixed in step 260 in the second vat 360 using a stirrer or agitator 362. The effect of the separation fluid 375 is to remove the bond between the second plastic layer 40 and/or the third plastic layer 60 and the metal layer 50 to produce metal shred from the metal layer 50 and plastic shreds from the second plastic layer 40 and the third plastic layer 60. This is achieved at a given temperature, for example between 20° C. and 50° C., during a treatment time of typically between 30 minutes and 300 minutes. In one aspect of the method, the given temperature is 40° C.

The separating fluid 375 and materials 380 can be removed through outlet 390 from the second vat 360 and sieved in step 280 in a sieve 365 to remove the solid materials, which include the plastic material from the first polymer layer 20, the second polymer layer 40 and/or the third polymer layer 60 as well as some of the metal shred from the metal layer 50. The separating fluid 375 is then recycled in step 285 by the filtration device 366 and placed back into the fluid dispenser 370. The filtration device 366 removes substantially all impurities from the separation fluid 375, as well as any remaining metal shred, which was not sieved out in step 280.

The resulting material 380 in the second vat 360 is a mixture of polymers and aluminum. This resulting material 380 is washed in step 286 in the washer 368, dried in step 287 in the dryer 395, and sorted in step 290 in the sorter 396. The sorting in step 290 can be made e.g. by wind-sifting. Depending on types of the polymer layers 20, 40 and 60 or the metal layer 50, the separation can take place in a wet environment before drying e.g. by float-sink-separation.

The washing water needs to be treated in step 296 with the water recycling device 369 before the washing water is also reused. These treatments include cross flow filtration techniques and/or reverse osmosis, which also allow reclaiming of at least some chemicals from the washing water.

The plastic components separated in step 290 can be extruded into new objects in step 292. The metal shreds can be pressed into pellets in step 294 for recycling. The post treatment steps 292 and 294 can be done in the device 399, exemplarily by extrusion or pressing machines.

In some aspects of the invention, the packaging material 300 to be recycled does not include any paperboard layer 30. In this case, the hydropulping process described in steps 220 to 234 and using the first vat 310 as well as the devices 320, 330, 335, 342, 350, 355 to does not need to take place.

In most embodiments of the invention, the separation fluid 375 used in the second vat 360 and coming from the fluid dispenser 370 is a microemulsion. The separation fluid 375 comprises a swelling agent, e.g. a hydrocarbon solvent, as the oil phase for the selective swelling of the second polymer layer 40 and/or the third polymer layer 60 compared to the aluminum layer 50, which does not swell under the influence of the swelling agent. The separation fluid 375 can also comprise at least one surfactant, which is used as emulsifier and wetting agent. The separation fluid 375 also includes a carboxylic acid, which is used to accelerate the process of separation of the second polymer layer 40 and the third polymer layer 60 from the metal layer 50 and considered to work by attacking the bonding agent between the metal layer 50 and the second polymer layer 40 and/or the third polymer layer 60.

The separation fluid 375 is kept between 20 and 50° C., and at pH values between 1.5 and 4. The actual values are chosen depending on the properties of the input laminates 10 or other multiple layer materials in the packaging material. Ideally, the method of this disclosure achieves a sufficiently high yield of metal from the metal layer 50 or polymers from the second polymer layer 40 and the third polymer layer 60 within the treatment time, while keeping the dissolution of the metal layer 50 to a minimum.

The separating fluid 375, if being a microemulsion, is formulated in order to avoid esterification reactions with the carboxylic acid. It is therefore not possible to use the usual co-surfactants, i.e. simple alcohols for stabilization. The microemulsion must be stable in the temperature range at which the second vat 360 is operating (20-50° C.). This can be achieved combining anionic surfactants with co-surfactants, such as but not limited to caprylic acid, or with hydrotropes such as phosphoric acid decyl ester. It is also possible to use non-ionic surfactants, e.g. ethoxylated isotridecanol, but these are not limiting of the invention.

EXAMPLES OF THE SEPARATING FLUID

The examples listed below are merely examples of suitable separating fluids and are not limiting of the invention.

Example 1

| | |
|---|---|
| Anionic surfactant | 12.0% sulfonic acids, C14-17-sec-alkane, sodium salts |
| Co-surfactant/hydrotrope | 3.3% caprylic acid |
| Swelling agent | 21.7% xylene (isomers) |
| Carboxylic acid | 11.6% acetic acid |
| Water | 51.4% water |

Example 2

| | |
|---|---|
| Anionic surfactant | 14.4% sulfonic acids, C14-17-sec-alkane, sodium salts |
| Co-surfactant/hydrotrope | 1.8% phosphoric acid decyl ester, sodium salt |
| Swelling agent | 20.0% xylene (isomers) |
| Carboxylic acid | 12.0% acetic acid |
| Water | 51.8% water |

Example 3

| | |
|---|---|
| Anionic surfactant | 10.8% sulfonic acids, C14-17-sec-alkane, sodium salts |
| Co-surfactant/hydrotrope | 4.8% caprylic acid |
| Swelling agent | 25.0% solvent naphtha, heavy aromatic, naphthalene depleted |
| Carboxylic acid | 6.0% acetic acid |
| Water | 53.4% water |

Results

The separating fluid 375 of example 1 achieves a high degree of delamination in a given treatment time (for example 30 minutes). The separating fluid of example 2 attacks the aluminum in the metal layer 50 only to a small extent, and the separating fluid of example 3 has a flash point above 100° C.

It will be possible to accelerate the processes by using the short chain carboxylic acids such as acetic acid, formic acid or propanoic acid. Higher carboxylic acids could also be used but have disadvantages, e.g. butanoic acid being known for its disgusting odor.

The purpose of the hydrocarbon solvent as the swelling agent to swell the polymer layers 40 and 60. In principle any liquid hydrocarbon could be used, such as the aromatic hydrocarbons given in the examples. It would also be possible to use toluene, ethylbenzene or other solvents of the solvent naphtha types. Also applicable are alicyclic hydrocarbons, such as cyclohexane or decalin. It is thought that acyclic aliphatic hydrocarbons or mixtures such as mineral spirits could also be used. Other swelling agents include but are not limited to other aprotic solvents, such as ketones, esters or ethers.

The surfactant could be selected from a large number of anionic surfactants. In the examples 1-3 of this disclosure an alkyl sulfonate is used. Alternatives include alkyl sulfates, alkylbenzene sulfonates and sulfates, olefin sulfonates or alkyl ether sulfonates and sulfates. Zwitterionic surfactants, such as alkyl sulfobetaines, could also be used in principle, as well as the non-ionic surfactants, which are sufficiently stable in the presence of the carboxylic acid, for example end-capped non-ionic surfactants.

Other Examples of Multiple Layer Materials Used in Packaging

The disclosure has been illustrated with the separation of the layers of a laminate 10 also having a paperboard layer 30. It will be appreciated that the teachings of this disclosure can also be employed with other multiple layer materials comprising only polymer layers on a metal layer. In this case there will be no need to remove a paperboard layer before adding the separation fluid. Non-limiting examples of other multiple layer materials used in packaging materials include polyethylene/aluminum/polyethylene terephthalate, which is used in coffee packaging and drinks packaging, or polypropylene/aluminum/polyester laminates used in coffee packaging and pet food packaging, or polyethylene/aluminum/polyethylene, which is used in packaging for granulated raw materials for the industry.

The invention claimed is:

1. A method for the separation of a metal layer from a polymer layer in a packaging material comprising a multiple layer material, wherein the multiple layer material comprises at least the metal layer on the polymer layer, the method comprising:
    placing the packaging material in a vat comprising a separation fluid, wherein the separation fluid comprises a mixture comprising water, at least one swelling agent, at least one anionic surfactant, at least one carboxylic acid, and at least one of a co-surfactant or a hydrotrope; and
    removing the separated polymer layer and the separated metal layer from the vat.

2. The method of claim 1, wherein the swelling agent is at least one of a hydrocarbon solvent or an aprotic solvent.

3. The method of claim 1, wherein the separation fluid is a microemulsion.

4. The method of claim 1, wherein the at least one anionic surfactant is selected from the group of anionic surfactants consisting of alkyl sulfonates and sulfates, alkylbenzene sulfonates and sulfates, olefin sulfonates, alkyl ether sulfonates and sulfates, or mixtures thereof.

5. The method of claim 1, wherein the at least one carboxylic acid is selected from the group of short chain carboxylic acids consisting of acetic acid, formic acid or propanoic acid, or mixtures thereof.

6. The method of claim 1, further comprising at least one of sieving or filtering the separation fluid with components of the multiple layer material and thereafter sorting to obtain a first fraction of metal from the metal layer and a second fraction of plastic from the polymer layer.

7. The method of claim 1, further comprising recycling of the separation fluid.

8. A method for recycling packaging material comprising a multiple layer material comprising a metal layer on at least one plastic layer, wherein the method comprises:
    placing the packaging material in a second vat comprising a separation fluid to produce a mixture of metal shreds from the metal layer, plastic shreds from the polymer layer and residual components, the separation fluid comprising water, at least one swelling agent, at least one anionic surfactant, at least one carboxylic acid, and at least one of a co-surfactant or a hydrotrope.

9. The method of claim 8, further comprising, if the packaging material further comprises a paperboard layer, treating initially the packaging material in a first vat by adding water and producing a slurry; sieving the slurry; and producing paper.

10. The method of claim 8, further comprising compressing the metal shreds to produce metal pellets.

11. The method of claim 8, wherein the metal layer is from aluminium or an alloy thereof.

12. The method of claim 8, wherein the at least one plastic layer is a polyolefin.

13. The method of claim 8, further comprising recycling of the separation fluid.

14. The method of claim 2, wherein the hydrocarbon solvent is at least one of an aromatic hydrocarbons, solvents of the naphtha type, olefins, terpenese, alicyclic hydrocarbons or acyclic aliphatic hydrocarbons;
    wherein the aromatic hydrocarbons are selected from the group of aromatic hydrocarbons consisting of toluene, xylene or ethylbenzene; and
    wherein the alicyclic hydrocarbons are selected from the group of alicyclic hydrocarbons selected from the group consisting of cyclohexane or decalin.

15. The method of claim 2, wherein the aprotic solvent is selected from the group of aprotic solvents comprising ketones, esters and ethers.

* * * * *